(12) United States Patent
Staller

(10) Patent No.: US 7,978,260 B2
(45) Date of Patent: Jul. 12, 2011

(54) ELECTRONIC CAMERA AND METHOD WITH FILL FLASH FUNCTION

(75) Inventor: Norman D. Staller, Beverly, MA (US)

(73) Assignee: Senshin Capital, LLC, Wilmington, DE (US)

( * ) Notice: Subject to any disclaimer, the term of this patent is extended or adjusted under 35 U.S.C. 154(b) by 1601 days.

(21) Appl. No.: 10/662,763

(22) Filed: Sep. 15, 2003

(65) Prior Publication Data

US 2005/0057682 A1 Mar. 17, 2005

(51) Int. Cl.
*H04N 5/222* (2006.01)
*H04N 7/18* (2006.01)

(52) U.S. Cl. ........ 348/371; 348/370; 348/130; 348/131; 348/132; 348/133

(58) Field of Classification Search .................. 348/371, 348/370, 131–133; 396/65, 61, 331, 175
See application file for complete search history.

(56) References Cited

U.S. PATENT DOCUMENTS

| | | | |
|---|---|---|---|
| 4,192,587 A | 3/1980 | LaRocque et al. | 354/27 |
| 4,262,301 A | 4/1981 | Erlichman | |
| 4,285,584 A | 8/1981 | Canter | 354/31 |
| 4,345,828 A | 8/1982 | Johnson | |
| 4,395,102 A * | 7/1983 | Pizzuti | 396/350 |
| 4,423,936 A * | 1/1984 | Johnson | 396/123 |
| 4,937,676 A | 6/1990 | Finelli et al. | |
| 4,941,011 A * | 7/1990 | Farrington | 396/225 |
| 5,032,911 A | 7/1991 | Takimoto | |
| 5,049,911 A * | 9/1991 | Shimizu | 360/31 |
| 5,050,001 A | 9/1991 | Hatanaka et al. | |
| 5,128,773 A | 7/1992 | Sato | |
| 5,673,190 A | 9/1997 | Kahleck et al. | |
| 5,742,373 A | 4/1998 | Alvelda | |
| 5,742,905 A | 4/1998 | Pepe et al. | |
| 5,754,305 A | 5/1998 | DeClerck et al. | |

(Continued)

FOREIGN PATENT DOCUMENTS

DE    198 07 303    1/1999

(Continued)

OTHER PUBLICATIONS

Microdisplay Report: What are Microdisplays? (http://www.mdreport.com/whatis.html). 1999.

(Continued)

*Primary Examiner* — Sinh Tran
*Assistant Examiner* — Selam Gebriel
(74) *Attorney, Agent, or Firm* — Woodcock Washburn LLP

(57) ABSTRACT

A method and camera for electronic image capture provide an electronic image capture device, a scanning aperture shutter located to control light energy received by the image capture device, a flash unit oriented to illuminate an image scene, a photocell unit adapted for sensing visible spectrum energy and infrared spectrum energy received from the image scene, and an exposure control system responsive to the photocell unit and operatively connected to the scanning aperture shutter and the flash unit. The exposure control system is adapted to control an amount of fill flash energy received from the image scene in relation to visible ambient light energy received from the image scene during image capture by illuminating the flash unit once a predetermined amount of ambient visible spectrum energy is sensed by the photocell unit and by extinguishing the flash unit once a predetermined amount of infrared energy is sensed by the photocell unit.

30 Claims, 4 Drawing Sheets

U.S. PATENT DOCUMENTS

| | | | |
|---|---|---|---|
| 5,802,413 | A | 9/1998 | Stephenson |
| 5,822,637 | A | 10/1998 | Stephenson |
| 5,881,326 | A | 3/1999 | Sakamoto .................... 396/161 |
| 5,894,326 | A | 4/1999 | McIntyre et al. |
| 5,920,298 | A | 7/1999 | McKnight |
| 5,943,515 | A * | 8/1999 | Omura ......................... 396/106 |
| 5,946,031 | A | 8/1999 | Douglas |
| 5,991,290 | A | 11/1999 | Malik |
| 6,081,076 | A | 6/2000 | Ogawa |
| 6,160,960 | A | 12/2000 | Mikoshiba et al. ............. 396/61 |
| 6,205,294 | B1 | 3/2001 | Norris et al. |
| 6,275,104 | B1 | 8/2001 | Holter |
| 6,314,476 | B1 | 11/2001 | Ohara |
| 6,356,356 | B1 | 3/2002 | Miller et al. |
| 6,396,565 | B1 | 5/2002 | Yamamoto et al. |
| 6,445,694 | B1 | 9/2002 | Swartz |
| 6,473,498 | B1 | 10/2002 | Foth |
| 6,516,147 | B2 | 2/2003 | Whiteside ....................... 396/61 |
| 6,594,032 | B1 | 7/2003 | Hiroki et al. |
| 6,633,635 | B2 | 10/2003 | Kung et al. |
| 6,999,114 | B1 | 2/2006 | Chapnik |
| 7,206,806 | B2 | 4/2007 | Pineau |
| 7,233,408 | B2 | 6/2007 | Henderson et al. |
| 2001/0031142 | A1 * | 10/2001 | Whiteside ....................... 396/61 |
| 2002/0051197 | A1 | 5/2002 | Minegishi |
| 2002/0081111 | A1 | 6/2002 | Ina et al. |
| 2002/0090145 | A1 * | 7/2002 | Yamada ........................ 382/284 |
| 2003/0115250 | A1 | 6/2003 | Bernier |
| 2005/0024499 | A1 | 2/2005 | Luciano et al. |

FOREIGN PATENT DOCUMENTS

| | | |
|---|---|---|
| EP | 0 680 192 | 2/1995 |
| EP | 0 598 513 | 1/2001 |
| EP | 1 100 003 | 5/2001 |
| EP | 1 665 777 | 5/2007 |
| JP | 06-175202 | 6/1994 |
| JP | 08-037613 | 2/1996 |
| JP | 08-201871 | 8/1996 |
| JP | 09-090461 | 4/1997 |
| JP | 2001-326854 | 11/2001 |
| WO | WO 01 17226 | 3/2001 |
| WO | WO 2005/029848 | 3/2005 |

OTHER PUBLICATIONS

Wright et al., "Die-Sized Displays Enable Microdisplays New Applications" (http://www.ad-tec.com/semiconductor/archive/sep98/lores/feature3.html) Sep. 1998.

United States Patent and Trademark Office: U.S. Appl. No. 12/024,213, filed Feb. 1, 2008, Chapnik.

International Preliminary Report on Patentability (IPER), issued Mar. 16, 2006, PCT/US2004/03002.

* cited by examiner

ELECTRONIC CAMERA AND METHOD WITH FILL FLASH FUNCTION

FIELD OF THE INVENTION

The present invention generally relates to electronic image capture and particularly to a fill flash function for such electronic image capture.

BACKGROUND OF THE INVENTION

Electronic imaging devices, such as those used in digital cameras, typically perform image capture differently from film based cameras. Electronic image capture devices typically integrate separate output signals from each photosensitive semiconductor pixel of an array of pixels. An image capture is typically initiated by simultaneously zeroing all of the integration values of the pixels, and various approaches have been used for terminating the image capture process. Such integrated values then need to be read out from each of the array pixels. Problems occur in controlling the amount of time over which each of the pixels continues to integrate sensed light signals.

Controlling the integration of such imaging devices is further complicated by the attempt to control a fill flash function, wherein a flash unit is used for part of the illumination of a scene including a near field object of limited brightness and a far field background of greater brightness. Such image capture and pixel integration is still further complicated by the additional need to achieve the proper balance of illumination between natural and artificial, or flash, light sources.

SUMMARY OF THE INVENTION

One embodiment of the present invention provides an electronic camera, including an electronic image capture device adapted for capturing an image scene, a scanning aperture shutter located to control light energy received by the electronic image capture device from the image scene, a photocell adapted for sensing light energy received from the image scene, and an exposure control system responsive to the photocell and operatively connected to the scanning aperture shutter, wherein the exposure control system is adapted to control the scanning aperture shutter and a flash unit in response to sensed light energy at the photocell to control an amount of fill flash energy in relation to ambient light energy received by the electronic image capture system during image capture.

The exposure control system may be adapted to illuminate the flash unit once a predetermined amount of ambient light energy is sensed by the photocell, and also to extinguish the flash unit once a predetermined amount of infrared spectrum energy is sensed by the photocell during flash unit illumination.

The photocell may include a visible spectrum photocell and an infrared spectrum photocell, and the exposure control system may adapted to use the visible spectrum photocell to sense ambient light energy received from the image scene prior to illumination by the flash unit and to use the infrared photocell for sensing infrared spectrum energy received from the image scene during illumination by the flash unit. Also, the scanning aperture shutter may include separate apertures for the image capture device, the visible spectrum photocell and the infrared spectrum photocell.

The exposure control system may be adapted to generate control signals for a detachable flash unit, or the flash unit may be constructed integrally with the camera.

Another embodiment of the present invention includes an electronic image capture device adapted for capturing an image scene, a scanning aperture shutter located to control light energy received by the image capture device, a flash unit oriented to illuminate the image scene, a photocell unit adapted for sensing visible spectrum energy and infrared spectrum energy received from the image scene, and an exposure control system responsive to the photocell unit and operatively connected to the scanning aperture shutter and the flash unit, wherein the exposure control system is adapted to control an amount of fill flash energy received from the image scene in relation to visible ambient light energy received from the image scene during image capture by illuminating the flash unit once a predetermined amount of ambient visible spectrum energy is sensed by the photocell unit and by extinguishing the flash unit once a predetermined amount of infrared energy is sensed by the photocell unit.

The visible spectrum and infrared spectrum photocells may be separate devices, and the shutter may include separate, proportionately operable, variable apertures for the image capture device and the photocell unit. Also, the flash unit may be a quenchable strobe light.

Yet another embodiment of the present invention provides a method for electronic image capture using a fill flash function, comprising the steps of using a scanning aperture shutter to control light energy received by an electronic image capture device, sensing visible ambient light energy and infrared energy received from an image scene, and controlling the scanning aperture shutter and a flash unit during image capture in response to the sensing to cause a predetermined ratio of fill flash light energy to ambient light energy to be received by the electronic image capture device including illuminating the flash unit once a predetermined amount of ambient light energy is sensed during image capture.

The step of sensing may use an infrared spectrum photocell for sensing infrared energy received from the image scene during illumination by the flash unit, and further may use a visible light spectrum photocell for sensing ambient light energy received from the image scene before illumination by the flash unit.

The step of controlling may include extinguishing the flash unit once a predetermined amount of infrared spectrum energy is sensed during flash unit illumination. Also, scanning aperture shutter may include separate, proportionately operable, variable apertures for image capture and the step of sensing.

BRIEF DESCRIPTION OF THE DRAWINGS

The present invention is illustratively shown and described in reference to the accompanying drawings, in which.

DETAILED DESCRIPTION OF THE DRAWINGS

Figure 1:
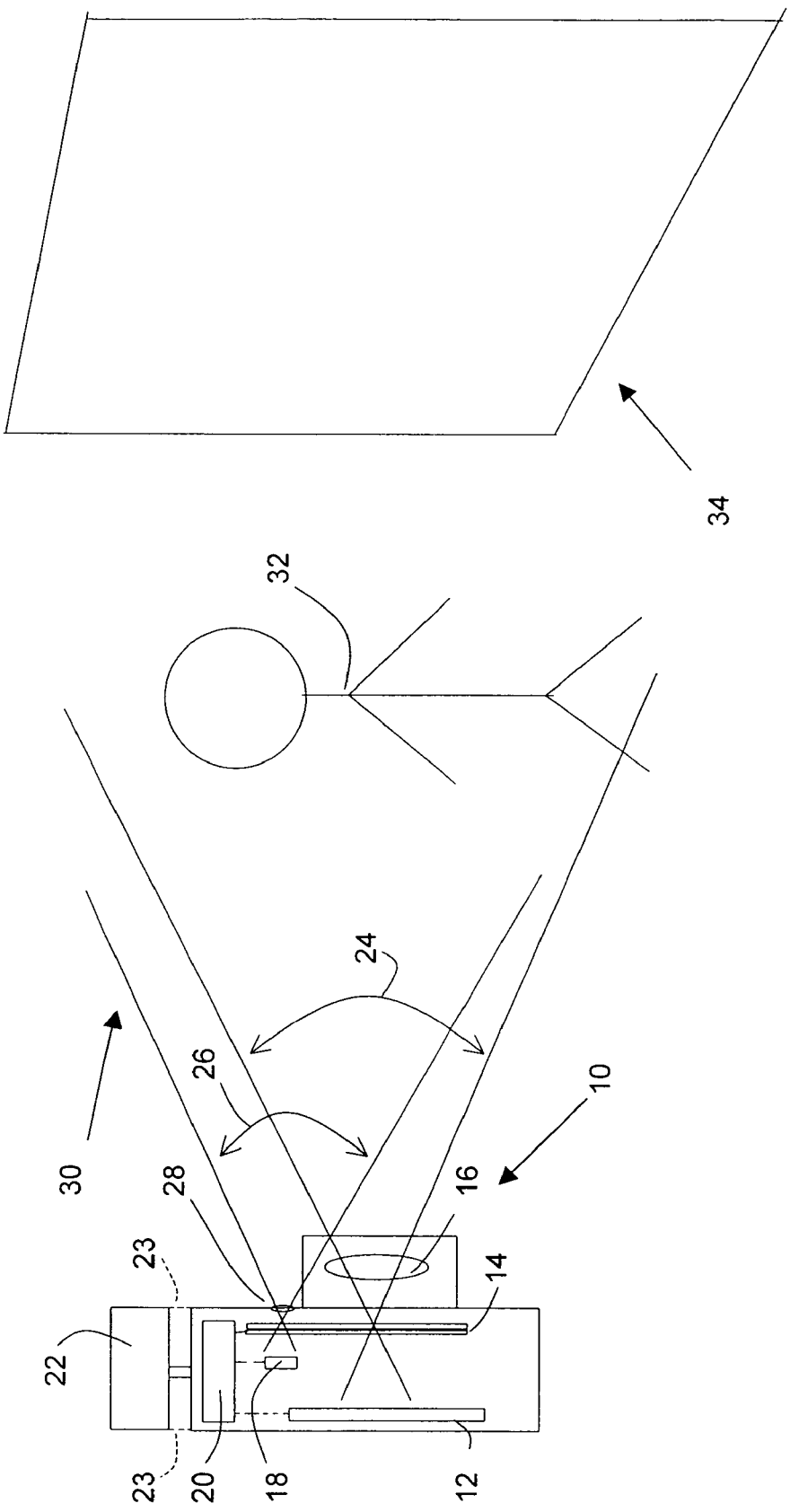
FIG. 1 is a representational side view diagram of an electronic camera constructed in accordance with one embodiment of the present invention as it would be used for image capture.

FIG. 1 shows an electronic camera 10 generally including an electronic image capture device 12, a scanning aperture shutter 14, imaging optics 16, a photocell 18 and an exposure control system 20. Attached to camera 10 is a removable flash unit 22. Camera 10 forms an electronic image capture system by using imaging optics 16, such as a lens, to focus an image scene of received light from a field of view 24, on image capture device 12. Scanning aperture shutter 14 is located between imaging optics 16 and image capture device 12 to control the amount of image light received by image capture device 12.

Photocell 18 is directed to sense light energy received from a substantially similar field of view 26, as determined by a separate optical element 28. Light energy received by photocell 18 passes through, and is likewise controlled by shutter 14. In this manner, the light energy sensed by photocell 18 is analogous to the light energy received by image capture device 12.

Exposure control system 20 is coupled to photocell 18 and is adapted to responsively control shutter 14 and image capture device 12 to control the amount of light energy received from flash unit 22 during image capture.

Image capture device 12 may be constructed in any suitable manner, such as in the form of a CCD, which is the best available embodiment at the time of this application. Also, although flash unit 22 is shown as a removable attachment to camera 10, it may also be constructed as an integral part of camera 10, as represented by phantom lines 23.

As is frequently the case, an image scene 30 may include a near-field object 32 set against a far-field background 34, wherein the natural illumination of far-field background 34 is greater than that of near-field object 32. In this case, a fill flash function is used to provide greater illumination to the near-field object 32 and thereby balance the lighting of the entire photo for better composition. Fill flash is even more frequently used to minimize shadow areas in near field objects. For these purposes, exposure control system 20 is adapted to control the amount of fill flash energy received from flash unit 22 in relation to ambient light energy received during an image capture.

Figure 2:
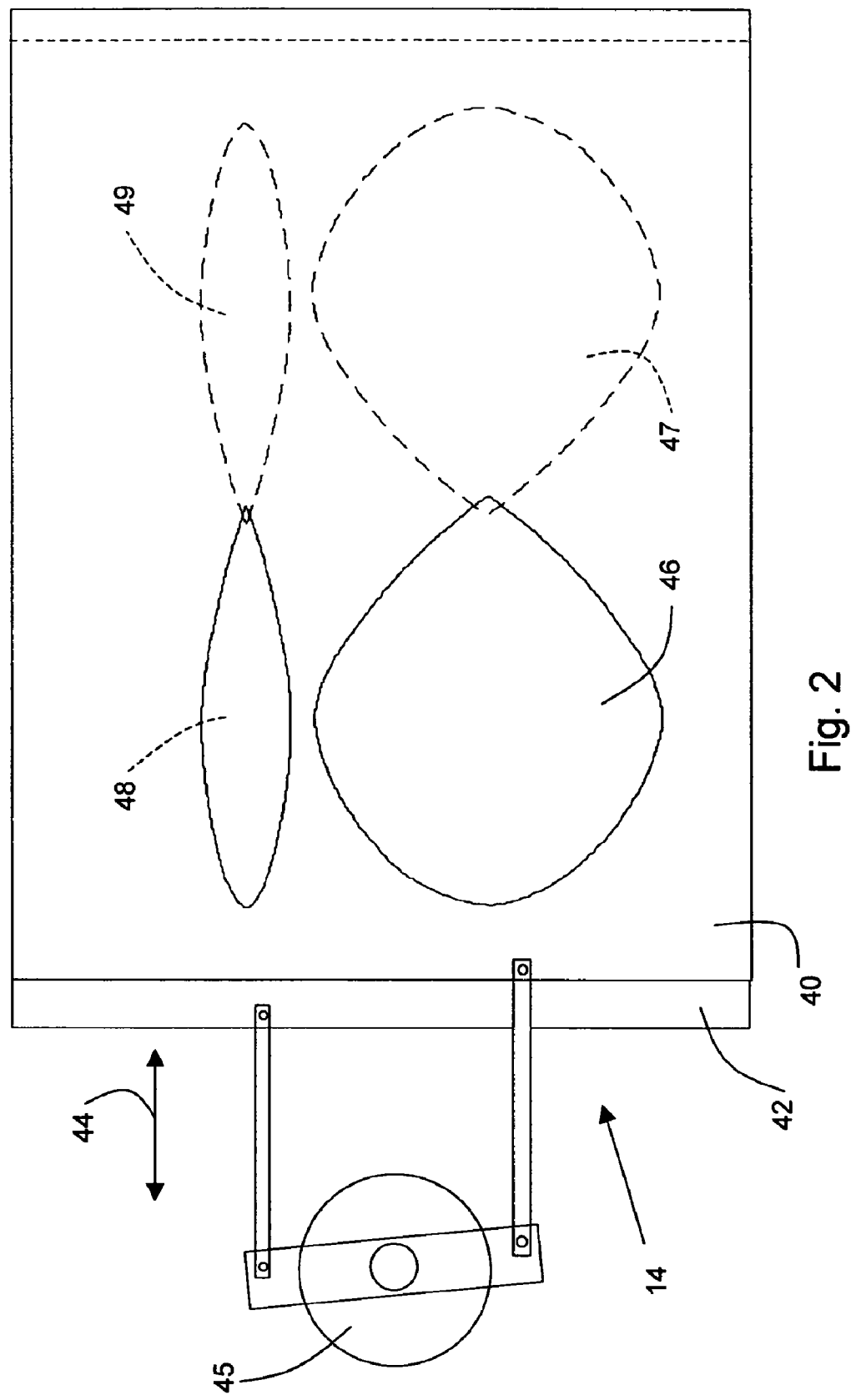
FIG. 2 is a representational front view of a blade shutter suitable for use with the camera of FIG. 1.

FIG. 2 is a representational front view of one form of scanning aperture shutter 14, called a blade shutter, which may be used with the camera 10 (FIG. 1). Shutter 14 typically includes a pair of rigid shutter blades 40, 42, which are adapted for relative lateral movement in the direction of arrows 44 by means of an electromechanical actuator 45. Front blade shutter 40 includes apertures 46, 48, and rear blade shutter 42 includes apertures 47, 49, shown in phantom. Aperture pair 46, 47 are intended for image capture and are aligned with image capture device 12 (FIG. 1). Aperture pair 48, 49 are intended for exposing photocell 18 (FIG. 1) to incident image light energy and are therefore intended to be aligned with photocell 18.

The relative lateral movement of shutter blades 40, 42 causes aperture pairs 46, 47 and 48, 49 to progressively overlap and thereby increase the aperture size for incident light energy. The separate aperture pairs 46, 47 and 48, 49 are proportionately sized so that any relative positioning of shutter blades 40, 42 results in generally the same proportion of light energy emitted through aperture pairs 46, 47 and 48, 49. Thus, the amount of light energy sensed by photocell 18 generally represents the same proportion of the light energy emitted through aperture pair 46, 47, regardless of the position of shutter blades 40, 42. In this manner, shutter 14 includes separate, proportionately operable, variable apertures 46, 47 and 48, 49 for image capture device 12 and photocell 18. The art of constructing blade shutters is well developed and many variations from the art may be used with the present invention. Although lateral movement of shutter blades 40, 42 is described, alternative forms of movement, such as rotational, may be used. Likewise, relative shapes and sizes may be varied in accordance with known methods. Although FIG. 2, depicts a single photocell aperture, more than one may be used, and their orientation may vary.

Figure 3:
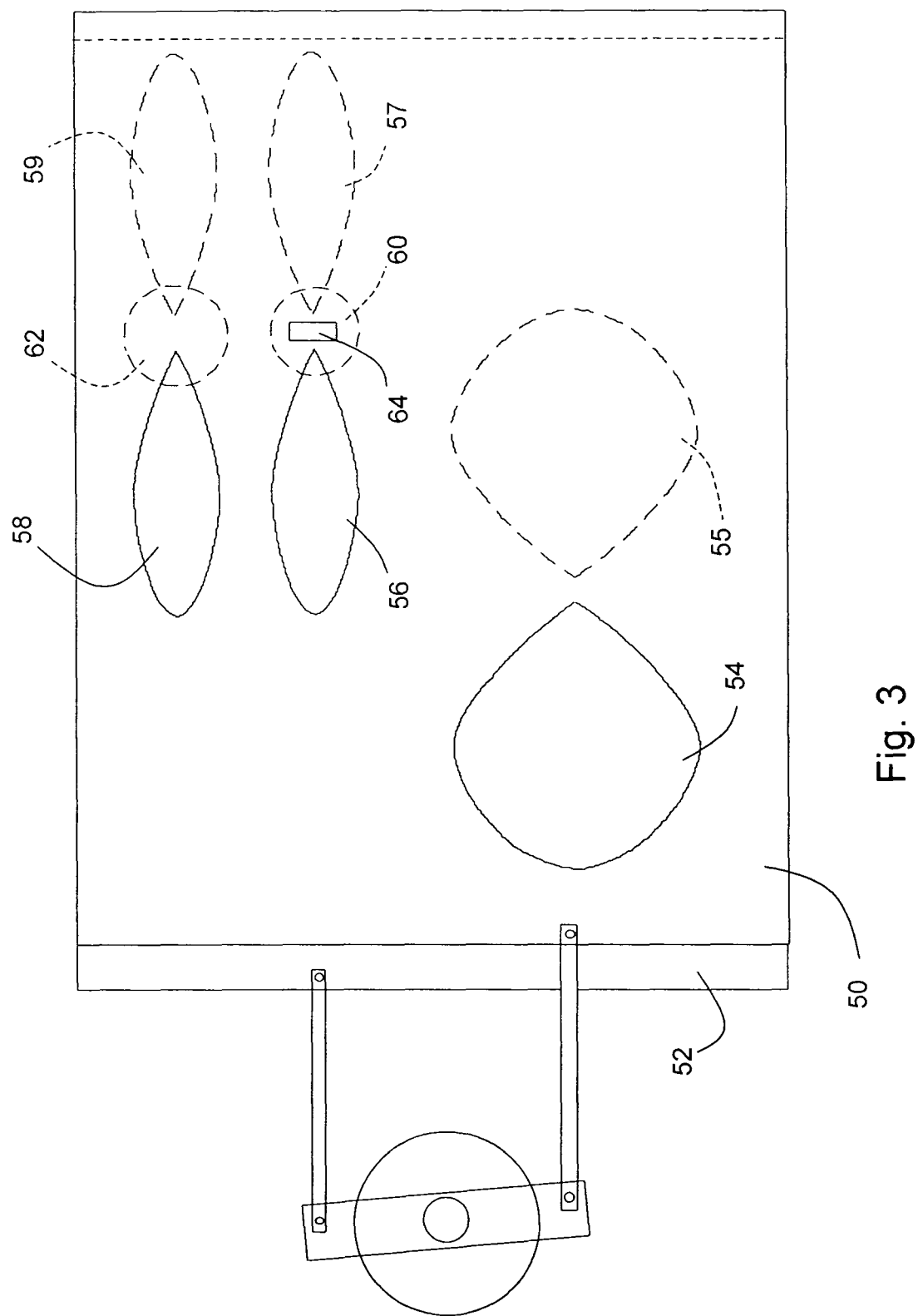
FIG. 3 is a representational front view of another blade shutter suitable for use with the camera of FIG. 1.

FIG. 3 shows a front view of another pair of blade shutters 50, 52, which include an aperture pair 54, 55 for image capture and separate aperture pairs 56, 57 and 58, 59 to accommodate a visible spectrum photocell 60 and an infrared spectrum photocell 62, respectively. Aperture pair 56, 57 are associated with a monitoring aperture pair 64, which is shown as a single aperture, but is actually a separate aperture in each aperture blade 50, 52. Monitoring aperture pair 64 is designed to be open while aperture pair 54, 55 is closed to allow ambient light monitoring of an image scene prior to image capture. Both aperture pairs 56, 57 and 58, 59 are shaped to provide an analogous representation of the opening of image capture aperture pair 54, 55. The relative orientation of the aperture pairs varies between FIGS. 2 and 3 as the orientation of image capture device 12 and photocell 18 may vary in the embodiment of FIG. 1.

Thus any suitable arrangement of apertures may be used, depending upon the specific photocell arrangement employed. Photocell 18 may take any suitable form such as separate visible spectrum and infrared spectrum photocells, or a single unit adapted to separately sense visible and infrared spectrum energy.

Figure 4:
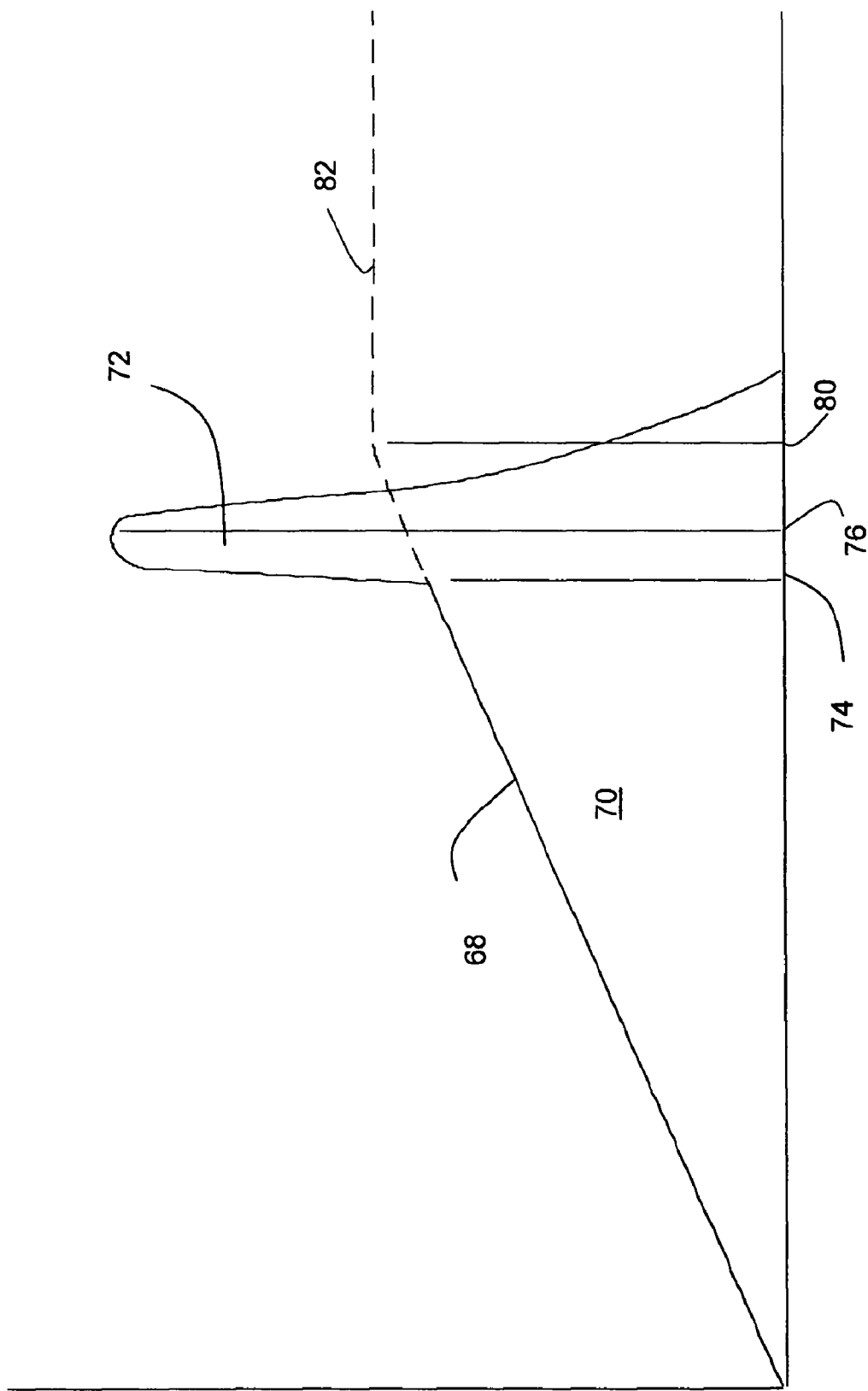
FIG. 4 is a graph of light energy captured by the camera of FIG. 1, verses time.

FIG. 4 is a graph, over the exposure time of an image capture, of the amount of light energy admitted through image capture aperture pair 46, 47 (FIG. 2) to thereby form an image on image capture device 12 (FIG. 1). FIG. 4 represents the operation of camera 10 (FIG. 1) in the fill flash mode, wherein the total light energy used for image capture is a mixed proportion of ambient scene illumination and fill flash. As mentioned, photocell 18 senses an analogous amount of received light during image capture. Whereas the instantaneous value of curve 68 represents the light level being received, the area 70, 72 under the graph represents the amount of light energy received over time. In this manner, by monitoring and integrating the output of photocell 18, exposure control system 20 can determine, in real time, the amount of image capture light energy incident upon image capture device 12.

A well known fill flash function typically uses ambient scene illumination to provide approximately 75% of the image capture light energy and the fill flash function to provide the remaining 25% of image capture energy. This distribution may be varied by image scene. For controlling this distribution, exposure control system 20 monitors and integrates the output of photocell 18 until the integrated area 70 under curve 68 reaches approximately 70% of the necessary amount of image capture light energy. At this point 74, flash unit 22 is illuminated and the amount of incident light energy sensed by photocell 18 increases, very steeply. At some point 76, exposure control system 20 determines that 90 to 95% of the desired image capture light energy has been received and exposure control system 20 quenches flash 22 and closes shutter 14. In a this manner, flash unit 22 may have a variable light output, and exposure control system 20 may be adapted to limit such variable light output in response to light energy sensed by photocell 18.

The rising slope of the left side of curve 68 represents the increasing aperture size of a scanning aperture shutter. It can be appreciated, that in low-light image scenes, the scanning aperture shutter may open to its maximum aperture before approximately 70% of the image capture energy has been sensed or received. In this situation, exposure control system 20 may be programmed to illuminate flash unit 22 to allow the 25% flash contribution to be collected. Shutter 14 may subsequently be left open after flash unit 22 is quenched, so that ambient light is further admitted to reach the preferred distribution. Ambient light received during flash illumination may not be measurable because of visible spectrum flash illumination, but it may be factored into the measurement.

It is known in flash unit technology that the amount of infrared flash energy reflected by objects is more consistent between various objects than the amount of visible spectrum energy. For this reason, the present invention preferably uses an infrared photocell for measuring image scene energy during flash illumination, and those measurements are converted to appropriate visible spectrum values or otherwise factored into the overall light measurement in accordance with methods known in the art. The art of exposure control devices for cameras is well developed, and various physically different devices may be constructed in accordance with known methods to implement the functions of the exposure control system of the present invention.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. An electronic camera, comprising:
   an electronic image capture device adapted for capturing an image scene;
   a photocell adapted for sensing a level of light energy received from said image scene;
   a scanning aperture shutter unit located to control light energy received by said electronic image capture device and the photocell;
   a flash unit; and
   an exposure control system, wherein said exposure control system is adapted to:
      integrate the level of light energy sensed during image capture,
      illuminate said flash unit during said image capture responsive to the integrated level of light energy reaching a first predetermined level, and
      extinguish said flash unit and close said scanning aperture shutter unit responsive to the integrated level of light energy reaching a second predetermined level.

2. The camera of claim 1, wherein said exposure control system is adapted to illuminate said flash unit once a predetermined amount of ambient light energy is sensed by said photocell.

3. The camera of claim 2, wherein said exposure control system is adapted to extinguish said flash unit once a predetermined amount of infrared spectrum energy is sensed by said photocell during flash unit illumination.

4. The camera of claim 1, wherein said photocell includes a visible spectrum photocell and an infrared spectrum photocell, and further wherein said exposure control system is adapted to use said visible spectrum photocell to sense ambient light energy received from said image scene prior to illumination by said flash unit and to use said infrared photocell for sensing infrared spectrum energy received from said image scene during illumination by said flash unit.

5. The camera of claim 4, wherein said scanning aperture shutter includes separate apertures for said image capture device, said visible spectrum photocell and said infrared spectrum photocell.

6. The camera of claim 1, wherein said exposure control system is adapted to generate control signals for a detachable flash unit.

7. The camera of claim 1, wherein said flash unit is constructed integrally with said camera.

8. An electronic camera, comprising:
   an electronic image capture device adapted for capturing an image scene;
   a scanning aperture shutter located to control light energy received by said image capture device;
   a flash unit oriented to illuminate said image scene;
   a photocell unit adapted for sensing a level of visible spectrum energy and infrared spectrum energy received from said image scene, wherein the scanning aperture shutter is able to control said sensed light energy; and
   an exposure control system, wherein said exposure control system is adapted to:
      integrate the level of visible spectrum energy and infrared spectrum energy sensed during image capture,
      illuminate said flash unit during said image capture responsive to the integrated level of visible spectrum energy and infrared spectrum energy reaching a first predetermined level, and
      extinguish said flash unit and close said scanning aperture shutter responsive to the integrated level of visible spectrum energy and infrared spectrum energy reaching a second predetermined level.

9. The camera of claim 8, wherein said visible spectrum and infrared spectrum photocells are separate devices.

10. The camera of claim 9, wherein said shutter includes separate, proportionately operable, variable apertures for said image capture device and said photocell unit.

11. The camera of claim 8, wherein said flash unit is a quenchable strobe light.

12. A method for electronic image capture using a fill flash function, comprising:
   using a scanning aperture shutter to control light energy received by an electronic image capture device;
   sensing a level of visible ambient light energy and infrared energy received from an image scene and controlled by said scanning aperture shutter; and
   controlling said scanning aperture shutter and a flash unit during image capture in response to said sensing, wherein said controlling comprises:
      integrating the level of visible ambient light energy and infrared energy sensed during image capture,
      illuminating a flash unit during said image capture responsive to the integrated level of visible ambient light energy and infrared energy reaching a first predetermined level, and
      extinguishing said flash unit and closing a scanning aperture shutter unit responsive to the integrated level of visible ambient light energy and infrared energy reaching a second predetermined level.

13. The method of claim 12, wherein said sensing uses an infrared spectrum photocell for sensing infrared energy received from said image scene during illumination by said flash unit.

14. The method of claim 13, wherein said sensing uses a visible light spectrum photocell for sensing ambient light energy received from said image scene before illumination by said flash unit.

15. The method of claim 12, wherein said scanning aperture shutter includes separate, proportionately operable, variable apertures for image capture and said sensing.

16. The method of claim 12, wherein said controlling includes extinguishing said flash unit once a predetermined amount of infrared spectrum energy is sensed during flash unit illumination.

17. An electronic camera, comprising:
    means for capturing an image scene;
    means for controlling light;
    wherein said means for controlling light is located to control light energy received by said means for capturing from said image scene;
    means for sensing a level of light energy received from said image scene, wherein said means for controlling light is able to control said sensed light energy; and
    means for controlling an exposure, wherein said means for controlling an exposure is adapted to:
        integrate the level of light energy sensed during image capture,
        illuminate said means for controlling light during said image capture responsive to the integrated level of light energy reaching a first predetermined level, and
        extinguish said means for controlling light and close said means for capturing responsive to the integrated level of light energy reaching a second predetermined level.

18. The camera of claim 17, wherein said means for controlling an exposure is adapted to illuminate said means for controlling light once a predetermined amount of ambient light energy is sensed by said means for sensing a level of light energy.

19. The camera of claim 18, wherein said means for controlling an exposure is adapted to extinguish said means for controlling light once a predetermined amount of infrared spectrum energy is sensed by said means for sensing a level of light energy during illumination of said means for controlling light.

20. The camera of claim 17, wherein said means for sensing light includes means for sensing visible spectrum and means for sensing infrared spectrum light, and further wherein said means for controlling an exposure is adapted to use said means for sensing visible spectrum to sense ambient light energy received from said image scene prior to illumination by said means for controlling light and to use said means for sensing infrared spectrum light for sensing infrared spectrum energy received from said image scene during illumination by said means for controlling light.

21. The camera of claim 20, wherein said means for controlling light includes separate apertures for said means for capturing an image scene, said means for sensing visible spectrum light and said means for sensing infrared spectrum light.

22. The camera of claim 17, wherein said means for controlling an exposure is adapted to generate control signals for a detachable means for controlling light.

23. The camera of claim 17, wherein said means for controlling light is constructed integrally with said camera.

24. An electronic camera, comprising:
    a means for capturing an image scene;
    a means for controlling light energy received by said means for capturing an image scene;
    a means for discharging a flash of light oriented to illuminate said image scene;
    a means for sensing visible spectrum energy and infrared spectrum energy received from said image scene, wherein said means for controlling light energy is able to control said sensed visible spectrum energy and said infrared spectrum energy;
    a means for sensing a level of light energy received from said image scene; and
    a means for controlling an exposure, wherein said means for controlling an exposure is adapted to:
        integrate the level of light energy sensed during image capture,
        illuminate said means for discharging a flash of light during said image capture responsive to the integrated level of light energy reaching a first predetermined level, and
        extinguish said means for discharging a flash of light and close said means for capturing an image scene responsive to the integrated level of light energy reaching a second predetermined level.

25. The camera of claim 24, wherein said means for sensing visible spectrum energy and infrared spectrum energy are separate devices.

26. The camera of claim 25, wherein said means for controlling light energy includes separate, proportionately operable, variable apertures for said image capturing means and said means for sensing a level of light energy.

27. The camera of claim 24, wherein said means for discharging a flash of light is a quenchable strobe light.

28. A method for electronic image capture using a fill flash function, comprising:
    using a means for controlling light to control light energy received by a means for capturing an electronic image;
    sensing a level of visible ambient light energy and infrared energy received from an image scene and controlled by said means for controlling light; and
    controlling said means for controlling light and a means for discharging a flash of light during image capture, wherein said controlling comprises:
        integrating the level of light energy sensed during image capture,
        illuminating said means for discharging a flash of light during said image capture responsive to the integrated level of light energy reaching a first predetermined level, and
        extinguishing said means for discharging a flash of light and closing said means for controlling light responsive to the integrated level of light energy reaching a second predetermined level.

29. An electronic image capture device adapted for capturing an image scene, comprising:
    a means for controlling light energy received by said electronic image capture device from said image scene;
    a means for discharging a flash of light oriented to illuminate said image scene;
    a means for sensing a level of light energy received from said image scene, wherein said means for controlling light energy is able to control said sensed level of light energy; and
    a means for controlling an exposure, wherein said means for controlling an exposure is adapted to:
        integrate the level of light energy sensed during image capture,
        illuminate said means for discharging a flash of light during said image capture responsive to the integrated level of light energy reaching a first predetermined level, and extinguish said means for discharging a flash of light and close said means for controlling light energy responsive to the integrated level of light energy reaching a second predetermined level.

30. An electronic image capture device adapted for capturing an image scene, comprising:
  a light control unit located to control light energy received by said image capture device;
  a flash unit oriented to illuminate said image scene;
  a light sensor unit adapted for sensing a level of visible spectrum energy and infrared spectrum energy received from said image scene, wherein said light control unit is able to control said sensed visible spectrum energy and said infrared spectrum energy; and
  an exposure control system, wherein said exposure control system is adapted to:
    integrate the level of visible spectrum energy and infrared spectrum energy sensed during image capture,
    illuminate said flash unit during said image capture responsive to the integrated level of visible spectrum energy and infrared spectrum energy reaching a first predetermined level, and
    extinguish said flash unit and close said light control unit responsive to the integrated level of visible spectrum energy and infrared spectrum energy reaching a second predetermined level.

* * * * *